US012774959B2

(12) United States Patent
Maeda

(10) Patent No.: US 12,774,959 B2
(45) Date of Patent: Oct. 27, 2026

(54) METHOD FOR SENSING METHYL SALICYLATE, METHYL SALICYLATE SENSOR, AND METHOD FOR DETECTING PATHOGEN INFECTION OF PLANTS

(71) Applicant: NEC Corporation, Tokyo (JP)

(72) Inventor: Katsumi Maeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 495 days.

(21) Appl. No.: 18/283,099

(22) PCT Filed: Mar. 23, 2022

(86) PCT No.: PCT/JP2022/013573

§ 371 (c)(1),
(2) Date: Sep. 20, 2023

(87) PCT Pub. No.: WO2022/202909

PCT Pub. Date: Sep. 29, 2022

(65) Prior Publication Data

US 2024/0183779 A1 Jun. 6, 2024

(30) Foreign Application Priority Data

Mar. 24, 2021 (JP) ................................ 2021-049789

(51) Int. Cl.
*G01N 21/64* (2006.01)
*G01N 27/416* (2006.01)

(52) U.S. Cl.
CPC ..... *G01N 21/6428* (2013.01); *G01N 27/4168* (2013.01); *G01N 2333/415* (2013.01)

(58) Field of Classification Search
None
See application file for complete search history.

(56) References Cited

U.S. PATENT DOCUMENTS

2018/0142277 A1 5/2018 Ramasamy et al.

FOREIGN PATENT DOCUMENTS

JP 2005-298349 A 10/2005
WO 2019/082942 A1 5/2019

OTHER PUBLICATIONS

Mariyappan, M. et al. Turn-on Fluorescence Chemosensor for Zn2+ Ion Using Salicylate Based Azo Derivatives and their Application in Cell-Bioimaging, Journal of Fluorescence (2019) 29:737-749 (Year: 2019).*

(Continued)

*Primary Examiner* — Xiaoyun R Xu
(74) *Attorney, Agent, or Firm* — Sughrue Mion, PLLC

(57) ABSTRACT

Provided is a method for sensing methyl salicylate, which is a plant hormone released when a plant is infected with a disease in cultivation of plants including agricultural crops, and thereby provided a method for early in-situ detection of disease infection in a plant. Disease infection in a plant can be detected at an early stage by utilizing a zinc compound that selectively recognizes methyl salicylate, which is a plant hormone released when a plant is infected by a pathogen, and forms a complex with methyl salicylate, as a receptor for sensing, and by utilizing a fluorescence emission phenomenon or a change in electrochemical behavior after the reaction with methyl salicylate.

19 Claims, 6 Drawing Sheets

(56) References Cited

OTHER PUBLICATIONS

Petrus, R. et al. Zinc complexes supported by methyl salicylato ligands: synthesis, structure, and application in ring-opening polymerization of L-lactide, Dalton Transactions, 2013, 42, 13838-13844 (Year: 2013).*
International Search Report for PCT Application No. PCT/JP2022/013573, mailed on Jun. 14, 2022.
Satoko Hosokawa, "Communication between plants via odor", J. Japan Association on Odor Environment, vol. 36, No. 3, pp. 153-155 (2005).
Malamy, Jocelyn P. et al., "Salicylic Acid: A Likely Endogenous Signal in the Resistance Response of Tobacco to Viral Infection", Science, vol. 250, 1990, pp. 1002-1004.
Metraux, J. P. et al., "Increase in Salicylic Acid at the Onset of Systemic Acquired Resistance in Cucumber", Science vol. 250, 1990, 250, pp. 1004-1006.

* cited by examiner (a)

(b)

(a)

(b)

METHOD FOR SENSING METHYL SALICYLATE, METHYL SALICYLATE SENSOR, AND METHOD FOR DETECTING PATHOGEN INFECTION OF PLANTS

This application is a National Stage Entry of PCT/JP2022/013573 filed on Mar. 23, 2022, which claims priority from JP Patent Application 2021-049789 filed on Mar. 24, 2021, the contents of all of which are incorporated herein by reference, in their entirety.

TECHNICAL FIELD

The present invention relates to a method for sensing methyl salicylate released when a plant is infected with a disease, a methyl salicylate sensor, a method for detecting disease infection of a plant, and the like.

BACKGROUND ART

It is known that plants have their own defense mechanisms that work against infection by pathogens such as filamentous fungi, feeding damage by insect pests and others, and stress due to environmental changes. Specifically, when plants are infected by pathogens, they synthesize salicylic acid, a signal substance, at the site of infection. Then, salicylic acid moves through the plant body via the sieve tube tissue and induces defense mechanisms in uninfected tissues, resulting in the development of systemic resistance to pathogens (systemic acquired resistance). Also, when plants undergo feeding damage by insect pests, they synthesize ethylene and jasmonic acid, which, in the same manner as salicylic acid, move through the plant body and induce defense mechanisms systemically (induced systemic resistance). Furthermore, it is known that plants adapt to environmental stress by synthesizing abscisic acid in the plant body in response to changes in the growth environment, such as drought, low temperature, and salt damage.

It is also known that, when plants are infected by pathogens or undergo feeding damage by insect pests, they have a mechanism to inform not only the damaged plants themselves but also the surrounding plants (Non-Patent Document 1). Specifically, salicylic acid, which is synthesized when infected by pathogens, is methylated to be methyl salicylate, which is released from the plants as a volatile signal substance to inform the surrounding plants of the pathogen infection, thus promoting defense mechanisms in advance. Jasmonic acid, which is synthesized at the time of damage by insect pests, is also known to be methylated to be methyl jasmonate, which is a volatile signal released from the plants, inducing resistance in the surrounding plants in advance.

As described above, it is known that plants release plant hormones as signal substances when they are damaged by diseases and insect pests, and sensing such signal substances as quickly as possible makes possible early detection of damage by diseases and insect pests.

As the method for early discovery of damage by sensing jasmonic acid released as a volatile signal at the time of insect pest damage, a method is disclosed in which a monitor plant with a luminescent protein gene is cultivated alongside a cultivated crop, and a phenomenon is utilized in which the monitor plant senses methyl jasmonate released and emits light when the crop undergoes damage by insect pests (Patent Document 1).

CITATION LIST

Patent Document

Patent Document 1: International Publication No. WO2019/082942

Non-Patent Document

Non-Patent Document 1: J. Japan Association on Odor Environment, Vol. 36, No. 3, 153-155 (2005).

SUMMARY OF INVENTION

Technical Problem

An object of the present invention is to provide a method for sensing methyl salicylate, which is a plant hormone released when a plant is infected with a disease, in the cultivation of plants including crops, as well as a methyl salicylate sensor, thereby providing a method for early in-situ detection of disease infection in a plant.

Solution to Problem

One aspect of the present invention utilizes a zinc compound that selectively recognizes and forms a complex with methyl salicylate, which is a volatile plant hormone, as a receptor for sensor. Also, one aspect of the present invention detects disease infection in a plant at an early stage by utilizing a fluorescence emission phenomenon of a complex produced by a reaction of methyl salicylate and a zinc compound. Furthermore, one aspect of the present invention detects disease infection in a plant at an early stage by utilizing a phenomenon in which electrochemical behavior is changed by a reaction of methyl salicylate and a zinc compound.

Advantageous Effect of Invention

According to the present invention, by using a zinc compound as a receptor for a sensor, methyl salicylate, a volatile plant hormone released when a plant is infected by a pathogen, can be selectively sensed. Furthermore, according to one aspect of the present invention, infection in a plant by a pathogen can be detected at an early stage.

DESCRIPTION OF EMBODIMENTS

Figure 1A:
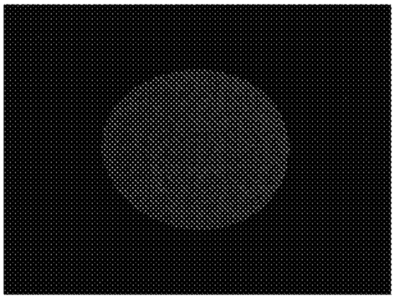
FIG. 1A shows a photograph for confirming fluorescence emission in Example 1.

Hereinafter, embodiments of the present invention will be described with reference to the accompanying drawings and others. However, while the embodiments mentioned below have technically preferred limitations for implementing the present invention, they are not intended to limit the scope of the invention to those described below.

The present inventors have conducted diligent studies in order to solve the above-mentioned problem. As a result, they have found that methyl salicylate, which is a volatile signal substance released when a plant is infected by a pathogen, can be selectively sensed by using a zinc compound, thus completing the present invention. Furthermore, the present inventors have found that disease infection in a plant can be detected at an early stage by utilizing a fluorescence emission phenomenon of a complex formed by a reaction of methyl salicylate and a zinc compound or by utilizing a change in electrochemical behavior.

Hereinafter, the present embodiments will be described in detail.

<Receptor for Methyl Salicylate: Zinc Compound>

A zinc compound that can be used as a receptor for sensing methyl salicylate is not particularly limited, but a zinc salt of organic acid such as a zinc carboxylate, zinc halide, or a hydrate thereof is preferred. The examples of the zinc compound include, but are not limited to, zinc(II) acetate, zinc(II) formate dihydrate, zinc(II) butyrate, zinc oxalate dihydrate, zinc(II) hexanoate, zinc(II) propionate, zinc(II) benzoate, zinc(II) octanoate, zinc(II) oleate, zinc(II) nitrate, zinc(II) chloride and the like. The zinc compound may be used singly, or may be used in combination of two or more types.

For example, zinc(II) acetate can selectively recognize methyl salicylate by forming a complex with methyl salicylate by the reaction shown in Formula (1) below.

Formula (1)

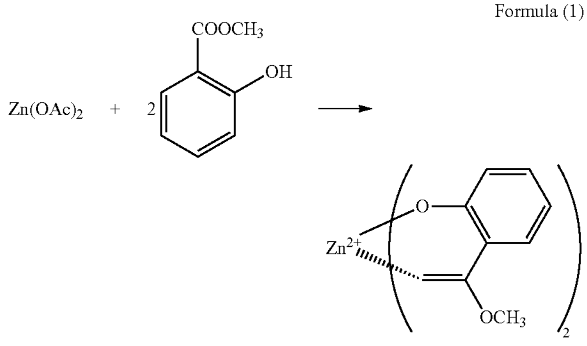

Accordingly, some embodiments of the present invention relate to a detection method for methyl salicylate comprising allowing a zinc compound to react with methyl salicylate to form a complex.

Some embodiments of the present invention relate to a sensing method for methyl salicylate, using a zinc compound as a receptor that selectively recognizes methyl salicylate.

In some embodiments, zinc(II) acetate may be used as the zinc compound.

In some embodiments, the reaction of the zinc compound and methyl salicylate is carried out in a solution. The solution may be, for example, but is not limited to, a dimethyl sulfoxide solution, a methanol solution, or an aqueous solution. In some embodiments, the concentration of the zinc compound may be, for example, in the range of 0.00001 mol/L to 5 mol/L, such as in the range of 0.00004 mol/L to 1 mol/L.

In some embodiments, the reaction of the zinc compound and methyl salicylate is carried out in a solid medium. The solid medium may be, but is not limited to, paper or glass (for example, a glass fiber, a porous glass substrate), or resin (for example, polymethyl methacrylate, polyethylene, polypropylene, polyvinyl chloride, polystyrene, nylon resin, polyamide, polycarbonate, polyethylene terephthalate, polybutylene terephthalate, polyphenylene oxide) or water-soluble polymer (such as cellulose-based polymer, agarose, starch-based polymer, sodium arginate, acrylate-based polymer, acrylamide-based polymer, polyvinyl alcohol, polyethylene oxide, polyvinylpyrrolidone).

<Fluorescence Emission Phenomenon>

The complex produced by the reaction of the zinc compound and methyl salicylate newly exhibits fluorescence emission. Specifically, the complex formed by the reaction of the zinc compound and methyl salicylate exhibits fluorescence emission by exposing it to excitation light with a wavelength of 200 to 400 nm. On the other hand, the zinc compound alone exhibits little fluorescence emission, which makes it possible to detect methyl salicylate.

Thus, some embodiments of the present invention relate to a method for detecting methyl salicylate, comprising: (i) allowing a zinc compound to react with methyl salicylate to form a complex; (ii) exposing the complex to excitation light; and (iii) detecting fluorescence emitted by the complex. In some embodiments, an appropriate wavelength in the range of 200 to 400 nm is selected as the excitation wavelength. Furthermore, in some embodiments, comparing the intensity of the detected fluorescence with a predetermined reference value to determine the concentration of methyl salicylate may also be performed.

Some embodiments of the present invention relate to a method for sensing methyl salicylate, utilizing a phenomenon in which methyl salicylate reacts with the zinc compound to form a zinc complex, resulting in fluorescence emission.

<Electrochemical Behavior>

The complex produced by the reaction of the zinc compound and methyl salicylate exhibits electrochemical behavior that is different from that of the receptor, the zinc compound. Specifically, a cyclic voltammetry measurement of an electrochemical cell containing the complex formed by the zinc compound and methyl salicylate shows that a large change in current value occurs around a certain potential. This makes it possible to detect methyl salicylate by monitoring this current value.

Some embodiments of the present invention relate to a method for detecting methyl salicylate, comprising: (i)

allowing a zinc compound to react with methyl salicylate in a solution to form a complex; (ii) measuring a current flowing under a certain voltage; and (iii) detecting a change in current value caused by formation of the complex. In some embodiments, an appropriate value in the range of −1 to 2 V (vs. NHE) is selected as a value of the voltage. The solution may contain, for example, tetrabutylammonium perchlorate and the like as a supporting electrolyte, but the supporting electrolyte is not limited to this. In some embodiments, comparing the detected change in current value with a predetermined reference value to determine the concentration of methyl salicylate may also be performed.

Some embodiments of the present invention relate to a method for sensing methyl salicylate, utilizing a phenomenon in which a zinc compound reacts with methyl salicylate to form a complex, and the electrochemical behavior of the complex is different from that of the zinc compound.

Some embodiments of the present invention relate to a method for sensing methyl salicylate, utilizing a phenomenon in which a zinc compound reacts with methyl salicylate to form a complex and the current value of the complex in a certain potential region is different from that of the zinc compound.

In some embodiments, the method for sensing methyl salicylate of the present invention may be used for detecting pathogen infection in a crop.

<Methyl Salicylate Sensor>

Figure 12:
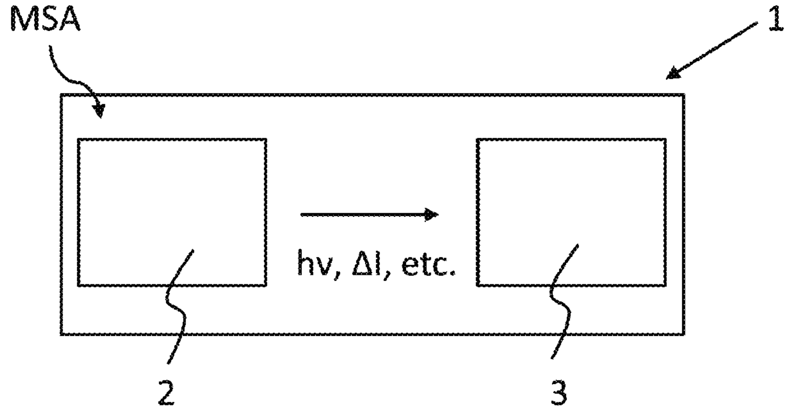
FIG. 12 shows one example of a schematic diagram of a structure of a methyl salicylate sensor of the present embodiment.

FIG. 12 shows one example of a schematic diagram of a structure of a methyl salicylate sensor of the present embodiment. A methyl salicylate sensor 1 of the present embodiment using a zinc compound as a receptor comprises at least a recognition section 2 for methyl salicylate (MSA) and a detection section 3 that detects recognition of methyl salicylate by the recognition section. The recognition section 2 at least comprises a zinc compound, which is a receptor. The zinc compound does not react with or recognize other plant hormones other than methyl salicylate, such as methyl jasmonate, and can therefore selectively recognize methyl salicylate. The detection section 3 is configured to be able to optically and/or electrochemically detect recognition of methyl salicylate by the recognition section 2 for methyl salicylate. For example, the optical detection section comprises at least an excitation light source and a detection element in order to detect fluorescence emission of a complex produced by the zinc compound and methyl salicylate, and detects methyl salicylate and measures the concentration thereof based on a change in fluorescence intensity. In order to detect a change in electrochemical behavior, for example, the electrochemical detection section constructs an electrochemical cell (detection element) with an electrode to detect a current caused by redox reaction of a complex formed by the reaction of the zinc compound and methyl salicylate, and detects methyl salicylate and measures the concentration thereof using a change in electrochemical behavior of the electrochemical cell (for example, change in current value at a certain potential).

Thus, some embodiments of the present invention relate to a methyl salicylate sensor for detecting methyl salicylate, at least comprising: a recognition section for methyl salicylate that comprises a zinc compound, which is a receptor that selectively recognizes methyl salicylate; and a detection section that detects recognition of methyl salicylate by the recognition section. In some embodiments, the methyl salicylate sensor of the present invention detects methyl salicylate, which is a plant hormone released when a crop is infected by a pathogen. Thus, the methyl salicylate sensor of the present invention may be used as a sensor for detecting pathogen infection in a crop. In some embodiments, the methyl salicylate sensor of the present invention can selectively detect methyl salicylate compared to methyl jasmonate.

Some embodiments of the present invention relate to a methyl salicylate sensor for detecting methyl salicylate, at least comprising: (i) a recognition section for methyl salicylate that comprises a zinc compound; and (ii) a detection section that optically detects recognition of methyl salicylate by the recognition section. In some embodiments, the optical detection section at least comprises an excitation light source and a detection element. In some embodiments, the methyl salicylate sensor of the present invention can detect methyl salicylate and/or measure the concentration thereof based on a change in the observed fluorescence intensity.

Further, some embodiments of the present invention relate to a methyl salicylate sensor for detecting methyl salicylate, at least comprising: (i) a recognition section for methyl salicylate that comprises a zinc compound; and (ii) a detection section that electrochemically detects recognition of methyl salicylate by the recognition section. In some embodiments, the electrochemical detection section comprises an electrochemical cell having an electrode that detects a current caused by redox reaction of a complex formed by the zinc compound and methyl salicylate. In some embodiments, the methyl salicylate sensor of the present invention can detect methyl salicylate and/or measure the concentration thereof based on a change in current value of the electrochemical cell.

In some embodiments, the detection section may comprise a computer that executes a program to process detection of methyl salicylate and/or measurement of the concentration thereof. Such a program may be, for example, a program that causes the computer to execute a step of receiving a signal from the optical and/or electrochemical detection element, a step of analyzing the received signal to determine the presence or absence of methyl salicylate and/or the concentration thereof, and a step of outputting the analysis result. In some embodiments, the analysis of the received signal may include comparing the received signal with a predetermined reference value to determine the presence or absence of methyl salicylate and/or the concentration thereof, for example. In some embodiments, the analysis result may be output to, for example, a display device connected to the sensor, or other equipment or the like connected via a network.

Thus, some embodiments of the present invention relate to a methyl salicylate sensor for detecting methyl salicylate, the methyl salicylate sensor at least comprising: a recognition section for methyl salicylate that comprises a zinc compound, which is a receptor that selectively recognizes methyl salicylate; and a detection section that detects recognition of methyl salicylate by the recognition section, the detection section comprising a detection element and a computer, wherein the program causes the computer to execute: (i) a step of receiving a signal from the optical and/or electrochemical detection element; (ii) a step of analyzing the received signal to determine the presence or absence of methyl salicylate and/or the concentration thereof; and (iii) a step of outputting the analysis result.

<Method for Early Detection of Pathogen Infection in Crop>

As one application of the methyl salicylate sensor of the present invention, by installing the methyl salicylate sensor near where a crop is planted and detecting methyl salicylate by the sensor, it is possible to detect pathogen infection in the crop at an early stage.

Thus, some embodiments of the present invention relate to a method for detecting pathogen infection in a crop, comprising installing a methyl salicylate sensor in the vicinity of the crop, and detecting methyl salicylate by the sensor. In some embodiments, the methyl salicylate sensor is a methyl salicylate sensor at least comprising: a recognition section for methyl salicylate that comprises a zinc compound, which is a receptor that selectively recognizes methyl salicylate; and a detection section that detects recognition of methyl salicylate by the recognition section. In some embodiments, the methyl salicylate sensor is a methyl salicylate sensor at least comprising: (i) a recognition section for methyl salicylate that comprises a zinc compound; and (ii) a detection section that optically and/or electrochemically detects recognition of methyl salicylate by the recognition section.

Examples of the crop that may be the monitoring target include, but are not limited to, cucumber, watermelon, tomato, eggplant, green pepper, paprika, pickles, shishito pepper, melon, Chinese cabbage, cabbage, radish, lettuce, leek, broccoli, onion, garlic, Japanese yam, asparagus, carrot, potato, celery, tobacco, rice, and strawberry.

Examples of the disease that may be detected include, but are not limited to, ring spot disease, leaf spot, *Corynespora* target spot, leaf mold, fusarium wilt, root rot wilt, *Verticillium* wilt, brown root rot, gray phytophthora rot, root rot, black dot root rot, southern blight, damping off, brown leaf spot, downy mildew, powdery mildew, gray mold, anthracnose, scab, *Sclerotinia* rot, gummy stem blight, leaf spot, blight, mosaic disease, spotted wilt, yellow leaf curl, bacterial wilt, bacterial soft rot, bacterial canker, pith necrosis, bacterial black spot, and bacterial leaf spot, and examples of the pathogen infection that may be detected include, but are not limited to, infections caused by the causative microorganisms of the above diseases.

In the context of the present disclosure, when referring to installing the sensor in the vicinity of the crop, examples of the term "vicinity" include, but are not limited to, a distance within 2 m, within 1 m, within 75 cm, within 50 cm, within 40 cm, within 30 cm, within 20 cm, within 10 cm, or within 5 cm of the crop to be monitored, and an appropriate distance is selected as appropriate in consideration of a variety of factors. A person skilled in the art would be able to set the position of the sensor to be installed as appropriate in consideration of a variety of conditions.

Some embodiments of the present invention relate to the use of a methyl salicylate sensor in detection of pathogen infection in a crop. Some embodiments of the present invention relate to use of a zinc compound in production of a methyl salicylate sensor.

EXAMPLES

Hereinafter, an embodiment of the present invention will be explained in details by using examples, but the present invention is not limited to these examples.

Example 1

Figure 1B:
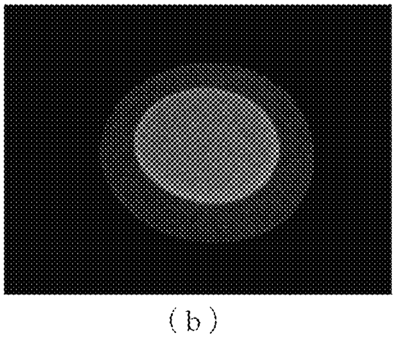
FIG. 1B shows a photograph for confirming fluorescence emission in Example 1.

0.2 ml of a solution obtained by dissolving 0.1 g of zinc(II) acetate (ZnA) in 3 ml of methanol was dropped onto a circular filter paper (45 mmΦ) and dried to obtain a filter paper containing ZnA. The obtained filter paper was excited with a UV lamp (wavelength 365 nm) to confirm whether fluorescence emission was present ((a) in FIG. 1A). Next, 0.03 ml of acetonitrile solution (0.1 mol/L) of methyl salicylate (MSA), which is released when a plant is infected with a pathogen, was dropped onto the filter paper and dried, and the obtained filter paper was similarly excited with a UV lamp to confirm whether fluorescence emission was present ((b) in FIG. 1B). As a result, it was found that (a) does not exhibit fluorescence, and it was found that ZnA reacts with methyl salicylate and exhibits fluorescence emission, indicating that methyl salicylate can be sensed.

Comparative Example 1

Figure 2A:
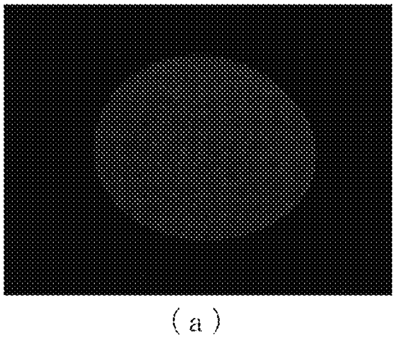
FIG. 2A shows a photograph for confirming fluorescence emission in Comparative Example 1.
Figure 2B:
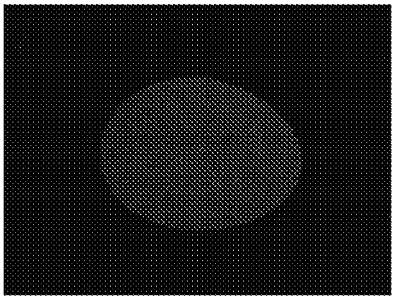
FIG. 2B shows a photograph for confirming fluorescence emission in Comparative Example 1.

0.2 ml of a solution obtained by dissolving 0.1 g of zinc(II) acetate (ZnA) in 3 ml of methanol was dropped onto a circular filter paper (45 mmΦ) and dried to obtain a filter paper containing ZnA. The obtained filter paper was excited with a UV lamp (wavelength 365 nm) to confirm whether fluorescence emission was present ((a) in FIG. 2A). Next, 0.03 ml of an acetonitrile solution (0.1 mol/L) of methyl jasmonate (MJA), which is a signal substance released when a plant undergoes damage by an insect pest, was dropped on the filter paper and dried, and the obtained filter paper was similarly excited with a UV lamp to confirm whether fluorescence emission was present ((b) in FIG. 2B). As a result, it was found that ZnA does not react with methyl jasmonate and not exhibit fluorescence emission.

From the results of Example 1 and Comparative Example 1, it was found that ZnA can selectively sense methyl salicylate, which is released by a plant at the time of pathogen infection.

Example 2

Figure 3:
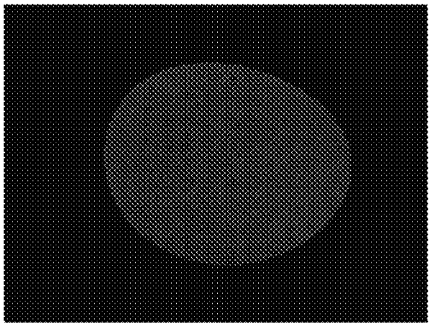
FIG. 3 shows a photograph for confirming fluorescence emission in Example 2.

0.2 ml of a solution obtained by dissolving 0.1 g of zinc(II) acetate (ZnA) in 3 ml of methanol was dropped onto a circular filter paper (45 mmΦ) and dried to obtain a filter paper containing ZnA. Next, this filter paper and 0.05 g of methyl salicylate placed in a Petri dish were left at rest and stored in a desiccator having a capacity of about 1.8 L so that they are not in direct contact. After 1 hour, the filter paper was taken out, and the filter paper was excited with a UV lamp (wavelength 365 nm) to evaluate whether fluorescence emission was present. As a result, blue-white fluorescence was confirmed (FIG. 3). From this result, it was found that methyl salicylate, which is released by a plant at the time of pathogen infection, can be sensed as a volatile signal.

Example 3

Figure 4:
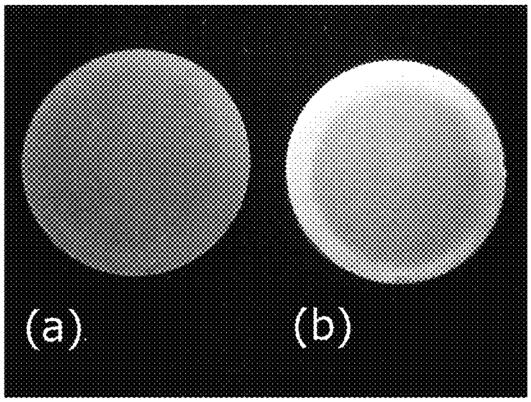
FIG. 4 shows a photograph for confirming fluorescence emission in Example 3.

0.2 ml of a solution obtained by dissolving 0.01 g of zinc(II) propionate (ZnP) in 3 ml of methanol was dropped onto a circular filter paper (45 mmΦ) and dried to obtain a filter paper containing ZnP. This filter paper and 0.05 g of methyl salicylate placed in a Petri dish were left at rest and stored in a desiccator having a capacity of about 1.8 L so that they are not in direct contact. After 3 hours, the filter paper was taken out, and excited with a UV lamp (wavelength 365 nm) along with an untreated filter paper to evaluate whether fluorescence emission was present. As a result, blue-white fluorescence was confirmed (FIG. 4(*b*)). In contrast, no fluorescence emission was observed on the untreated filter paper (FIG. 4(*a*)). From this result, it was found that methyl salicylate, which is released by a plant at the time of pathogen infection, can be sensed as a volatile signal.

Example 4

Figure 5:
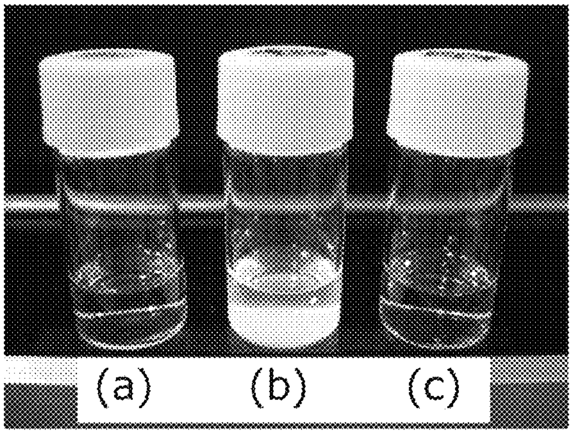
FIG. 5 shows a photograph for confirming fluorescence emission in Example 4.

0.01 g of zinc(II) propionate (ZnP) was dissolved in 3 ml of methanol to prepare a ZnP solution. Next, one drop of MSA was added to 1 ml of the ZnP solution to prepare a ZnP solution containing MSA. Alternatively, one drop of MJA was added to 1 ml of ZnP solution to prepare a ZnP solution containing MJA. The three solutions obtained were excited with a UV lamp (wavelength 365 nm) to confirm whether fluorescence emission was present (FIG. 5). As a result, no fluorescence emission was observed in the solution with ZnP alone (a) and in the solution with MJA (c), while the solution with MSA (b) showed blue-white fluorescence emission, indicating that methyl salicylate can be selectively sensed.

Example 5

[Fluorescence Spectrometry]

Figure 6:
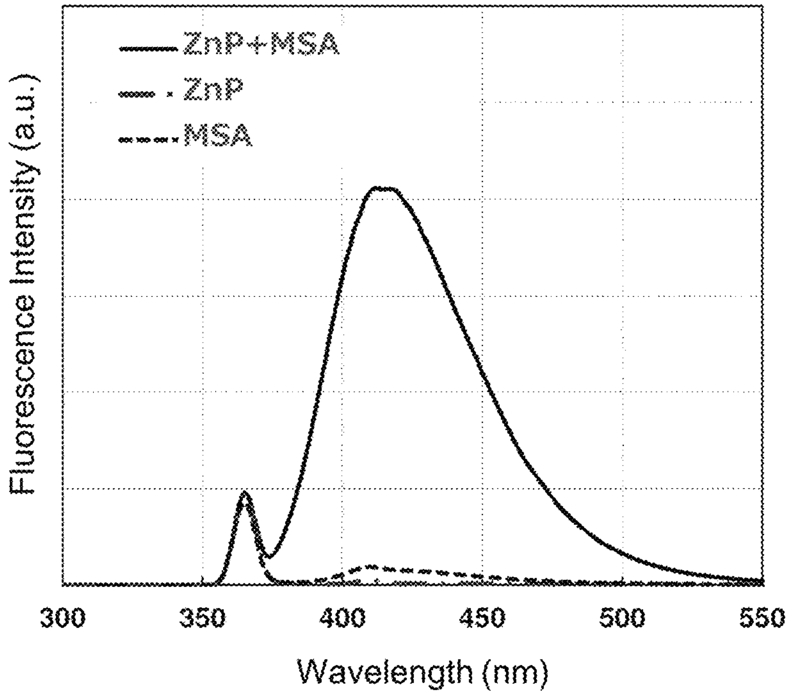
FIG. 6 shows a fluorescence spectrum curve obtained in Example 5.

0.9 ml of DMSO solution of zinc(II) propionate (ZnP) (concentration: 1.5 mmol/L) and 0.1 ml of DMSO solution of methyl salicylate (MSA) (concentration: 1.5 mmol/L) were mixed, and after 10 minutes, the mixed solution was diluted by 20 times. Thereafter, the resulting solution was put in a quartz cell and the fluorescence spectrum was measured at an excitation wavelength of 365 nm. Also, 0.9 ml of a DMSO solution of ZnP (concentration 1.5 mmol/L) and 0.1 ml of DMSO were mixed, the mixed solution was further diluted by 20 times, the resulting solution was put in a quartz cell, and the fluorescence spectrum was measured at an excitation wavelength of 365 nm. Also, 0.1 ml of a DMSO solution of MSA (concentration 1.5 mmol/L) and 0.9 ml of DMSO were mixed, the mixed solution was further diluted by 20 times, the resulting solution was put in a quartz cell, and the fluorescence spectrum was measured at an excitation wavelength of 365 nm. FIG. 6 shows the fluorescence spectrum curves obtained. The solid line represents the fluorescence spectrum of ZnP+MSA, the dash-dot-dash line represents the fluorescence spectrum of ZnP alone, and the dashed line represents the fluorescence spectrum of MSA alone. These results revealed that ZnP itself does not exhibit fluorescence, but ZnP reacts with methyl salicylate and exhibits fluorescence emission (maximum wavelength of 418 nm). It was also found that the fluorescence intensity of MSA alone is very small.

Example 6

[Fluorescence Spectrometry]

Figure 7:
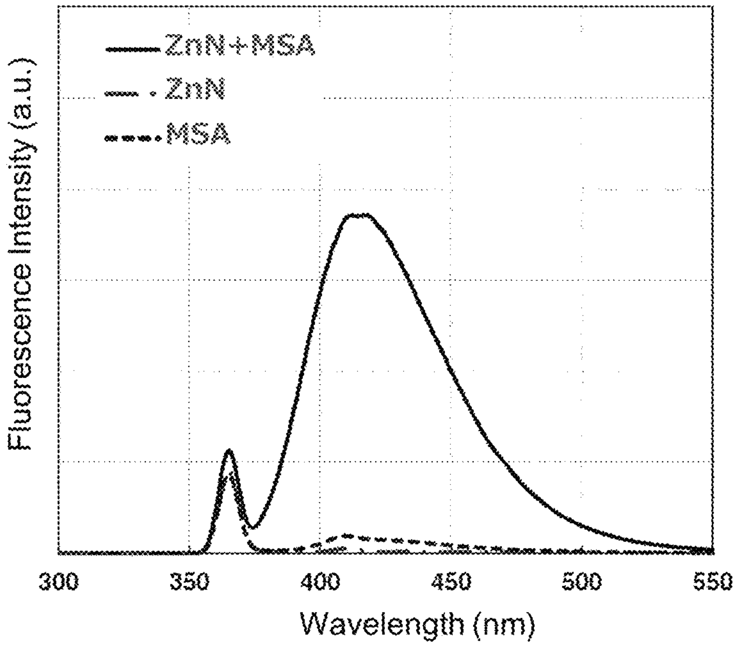
FIG. 7 shows a fluorescence spectrum curve obtained in Example 6.

0.9 ml of DMSO solution of zinc(II) nitrate hexahydrate (ZnN) (concentration: 1.5 mmol/L) and 0.1 ml of DMSO solution of methyl salicylate (MSA) (concentration: 1.5 mmol/L) were mixed, and after 10 minutes, the mixed solution was diluted by 20 times. Thereafter, the resulting solution was put in a quartz cell and the fluorescence spectrum was measured at an excitation wavelength of 365 nm. Also, 0.9 ml of a DMSO solution of ZnN (concentration 1.5 mmol/L) and 0.1 ml of DMSO were mixed, the mixed solution was further diluted by 20 times, the resulting solution was put in a quartz cell, and the fluorescence spectrum was measured at an excitation wavelength of 365 nm. Also, 0.1 ml of a DMSO solution of MSA (concentration 1.5 mmol/L) and 0.9 ml of DMSO were mixed, the mixed solution was further diluted by 20 times, the resulting solution was put in a quartz cell, and the fluorescence spectrum was measured at an excitation wavelength of 365 nm. FIG. 7 shows the fluorescence spectrum curves obtained. The solid line represents the fluorescence spectrum of ZnN+MSA, the dash-dot-dash line represents the fluorescence spectrum of ZnN alone, and the dashed line represents the fluorescence spectrum of MSA alone. These results revealed that ZnN itself does not exhibit fluorescence, but ZnN reacts with MSA and exhibits fluorescence emission (maximum wavelength of 418 nm).

Example 7

[Quantitative Evaluation of Fluorescence Intensity]

Figure 8:
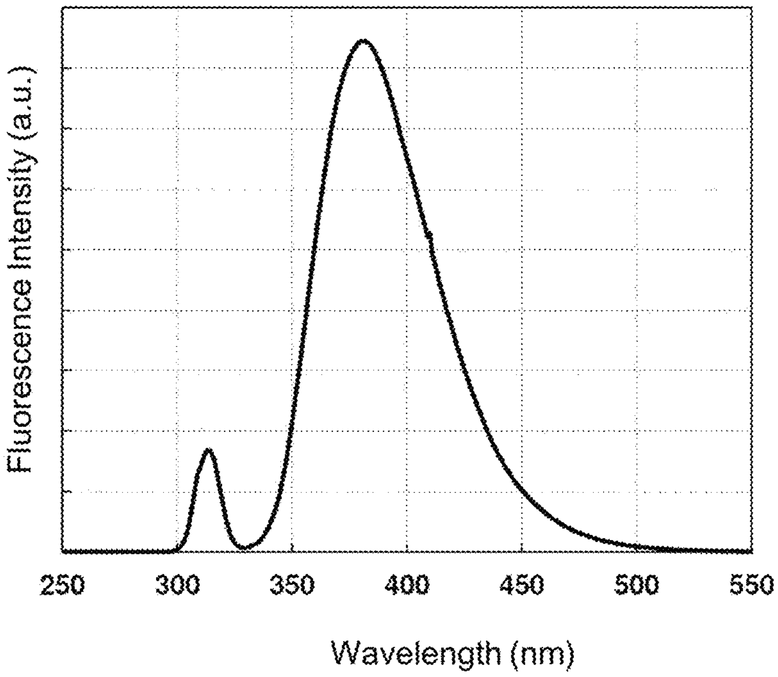
FIG. 8 shows a fluorescence spectrum curve of ZnA/MSA mixed solution obtained in Example 7.
Figure 9:
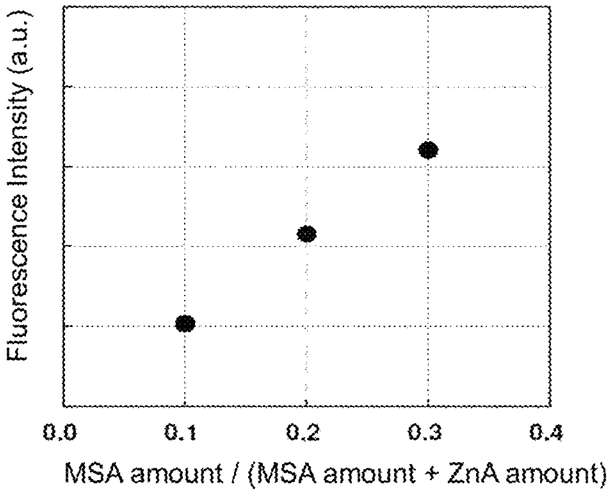
FIG. 9 shows a diagram plotting a relationship between a MSA ratio and a fluorescence intensity obtained in Example 7.

0.15 ml of a methanol solution of ZnA (concentration 0.01 mol/L) and 0.15 ml of a methanol solution of MSA (concentration 0.02 mol/L) were added, after 10 minutes, the mixed solution was diluted by 10 times and the resulting solution was put in a quartz cell and the fluorescence spectrum was measured at excitation wavelength of 343 nm. Consequently, FIG. 8 shows the fluorescence spectrum curve obtained. The peak wavelength at which the fluorescence intensity was strongest was 381 nm. Next, 0.9 ml of methanol solution a of ZnA (concentration 0.01 mol/L) and 0.1 ml of methanol solution b of MSA (concentration 0.02 mol/L) were added, after 10 minutes, the mixed solution was diluted by 200 times, the fluorescence spectrum was measured at an excitation wavelength of 343 nm and the fluorescence intensity at the wavelength of 381 nm was determined. In the same manner, the fluorescence intensity with 0.8 ml of ZnA solution a and 0.2 ml of MSA solution b, and also the fluorescence intensity with 0.7 ml of ZnA solution a and 0.3 ml of MSA solution b were determined. The obtained fluorescence intensities are plotted in FIG. 9. From the results, it was found that, as the ratio of MSA is increased, the fluorescence intensity is also increased, indicating that MSA can be quantitatively detected. In FIG. 9, the horizontal axis represents "volume of MSA solution b/(volume of MSA solution b+volume of ZnA solution a)" and the vertical axis represents fluorescence intensity.

Example 8

[Detection of MSA on an Agarose Gel Containing a Zinc Compound]

Figure 10:
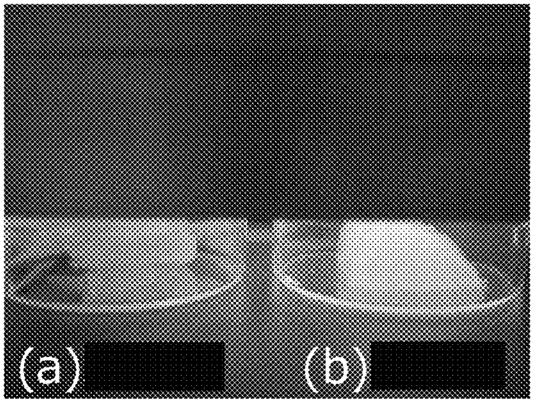
FIG. 10 shows a photograph for confirming fluorescence emission in Example 8.

0.0459 g of zinc acetate (ZnA) and 0.5 g of agarose were dispersed in 25 ml of water, and the agarose was dissolved and solated by heating and stirring at 95° C. Then, the resultant was allowed to cool to obtain a gel containing ZnA. A petri dish containing a portion of the obtained ZnA-containing gel and another petri dish containing 12 mg of methyl salicylate were stored statically in a desiccator without direct contact. After 24 hours, the gel was taken out and excited with a UV lamp (wavelength 365 nm) to evaluate whether fluorescence emission was present. As a result, blue-white fluorescence was confirmed (FIG. 10(*b*)). In contrast, no fluorescence emission was observed in the unexposed (not exposed to methyl salicylate) ZnA-containing gel (FIG. 10(*a*)). From these results, it was found that the ZnA-containing gel can sense methyl salicylate, which is released by a plant at the time of pathogen infection, as a volatile signal.

Example 9

[Measurement of Electrochemical Behavior]

An electrolyte solution was prepared by dissolving tetrabutylammonium perchlorate as a supporting electrolyte in DMSO (concentration: 0.1 mol/L), 10 ml of the electrolyte solution was placed in a glass container, and an electrochemical cell having three electrodes, comprising a working electrode, a counter electrode, and a reference electrode, was constituted. Note that glassy carbon was used as the working electrode, Pt as the counter electrode, and Ag/Ag+ electrode as the reference electrode. To this, 1 ml of DMSO solution of zinc propionate (ZnP) (concentration: 0.1 mol/L) was added, and the cyclic voltammetry (CV) was measured at room temperature (sweep potential: −0.8 to 1.2 V, sweep rate: 0.1 V/s).

Next, 1 ml of DMSO solution of methyl salicylate (MSA) (concentration: 0.1 mol/L) was added to it, and the CV measurement was carried out in the same manner.

Figure 11:
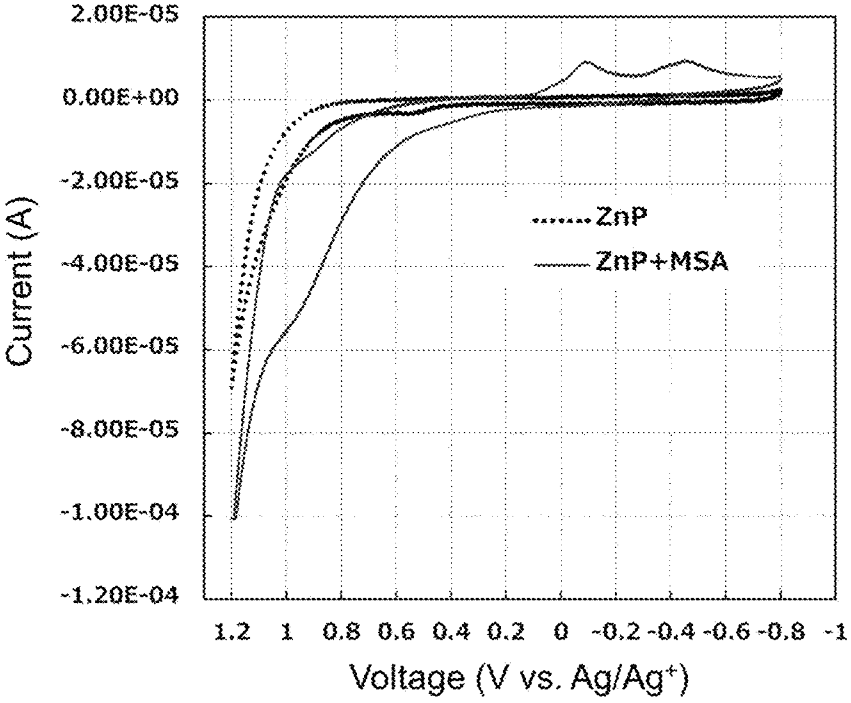
FIG. 11 shows a graph showing a current-voltage curve (cyclic voltammogram) obtained in Example 9.

The obtained current-voltage curve (cyclic voltammogram) is shown in FIG. 11. The dashed line shows the measurement result of ZnP alone, and the solid line shows the measurement result after adding MSA to ZnP. The results show that after the addition of MSA, new reduction peaks appear at potentials of −0.09 V and −0.46 V as compared to that before the addition. This indicates that methyl salicylate can be sensed through a change in current value, for example, by monitoring the current value flowing through the electrode at a voltage (−0.09 V and −0.46 V vs. Ag/Ag+ electrode) where the current value is greatly changed before and after the reaction with MSA.

The whole or part of the example embodiments disclosed above may be described as, but not limited to, the following supplementary notes.

(Supplementary Note 1)

A sensing method for sensing methyl salicylate, using a zinc compound as a receptor that selectively recognizes methyl salicylate.

(Supplementary Note 2)

The sensing method according to Supplementary note 1, wherein the zinc compound is at least one compound selected from the group consisting of zinc(II) acetate, zinc (II) formate dihydrate, zinc(II) butyrate, zinc(II) oxalate dihydrate, zinc(II) hexanoate, zinc(II) propionate, zinc(II) tartrate dihydrate, zinc(II) benzoate, zinc(II) octanoate, zinc (II) oleate, zinc(II) nitrate and zinc(II) chloride.

(Supplementary Note 3)

The sensing method according to Supplementary note 1 or 2, wherein the sensing utilizes a phenomenon in which methyl salicylate reacts with the zinc compound to form a complex and exhibit fluorescence emission.

(Supplementary Note 4)

The sensing method according to any one of Supplementary notes 1 to 3, wherein the sensing utilizes a phenomenon in which electrochemical behavior is changed by a reaction of the zinc compound and methyl salicylate.

(Supplementary Note 5)

The sensing method according to Supplementary note 4, wherein the sensing utilizes a change in current value caused by a reaction of the zinc compound and methyl salicylate.

(Supplementary Note 6)

A methyl salicylate sensor for detecting methyl salicylate, at least comprising: i) a recognition section for methyl salicylate that comprises a zinc compound; and ii) a detection section that detects recognition of methyl salicylate by the recognition section.

(Supplementary Note 7)

A method for detecting pathogen infection in a crop, comprising installing the methyl salicylate sensor according to Supplementary note 6 in a vicinity of the crop, and detecting methyl salicylate by the methyl salicylate sensor.

(Supplementary Note 8)

A methyl salicylate sensor for detecting methyl salicylate, at least comprising: a recognition section for methyl salicylate that comprises a zinc compound, which is a receptor that selectively recognizes methyl salicylate; and a detection section that detects recognition of methyl salicylate by the recognition section, the detection section comprising an optical and/or electrochemical detection element and a computer, wherein the methyl salicylate sensor has a program that causes the computer to execute:

i) a step of receiving a signal from the optical and/or electrochemical detection element;

ii) a step of analyzing the received signal to determine presence or absence of methyl salicylate and/or a concentration thereof; and iii) a step of outputting an analysis result.

(Supplementary Note 9)

A program controlling a methyl salicylate sensor for detecting methyl salicylate, the methyl salicylate sensor at least comprising: a recognition section for methyl salicylate that comprises a zinc compound, which is a receptor that selectively recognizes methyl salicylate; and a detection section that detects recognition of methyl salicylate by the recognition section, the detection section comprising an optical and/or electrochemical detection element and a computer, wherein the program causes the computer to execute:

i) a step of receiving a signal from the optical and/or electrochemical detection element;

ii) a step of analyzing the received signal to determine presence or absence of methyl salicylate and/or a concentration thereof; and iii) a step of outputting an analysis result.

(Supplementary Note 10)

A detection method for detecting methyl salicylate, comprising: (i) allowing a zinc compound to react with methyl salicylate to form a complex; (ii) exposing the complex to excitation light; and (iii) detecting fluorescence emitted by the complex.

(Supplementary Note 11)

The detection method according to Supplementary note 10, wherein a wavelength in a range of 200 to 400 nm is used as the excitation wavelength.

(Supplementary Note 12)

The detection method according to Supplementary note 10 or 11, further comprising comparing an intensity of the detected fluorescence with a predetermined reference value to determine a concentration of methyl salicylate.

(Supplementary Note 13)

A detection method for detecting methyl salicylate, comprising: (i) allowing a zinc compound to react with methyl salicylate in a solution to form a complex; (ii) measuring a current flowing through the solution under a certain voltage; and (iii) detecting a change in current value caused by formation of the complex.

(Supplementary Note 14)

The detection method according to Supplementary note 13, wherein a value of the voltage is in a range of −1 to 2 V.

(Supplementary Note 15)

The detection method according to Supplementary note 13 or 14, wherein the solution comprises tetrabutylammonium perchlorate as a supporting electrolyte.

(Supplementary Note 16)

The detection method according to any one of Supplementary notes 13 to 15, further comprising comparing the detected change in current value with a predetermined reference value to determine a concentration of methyl salicylate.

(Supplementary Note 17)

The detection method according to any one of Supplementary notes 10 to 16, wherein the zinc compound is at least one compound selected from the group consisting of zinc(II) acetate, zinc(II) formate dihydrate, zinc(II) butyrate, zinc(II) oxalate dihydrate, zinc(II) hexanoate, zinc(II) propionate, zinc(II) tartrate dihydrate, zinc(II) benzoate, zinc (II) octanoate, zinc(II) oleate, zinc(II) nitrate and zinc(II) chloride.

(Supplementary Note 18)

A methyl salicylate sensor for detecting methyl salicylate, at least comprising: (i) a recognition section for methyl salicylate that comprises a zinc compound; and (ii) a detection section that optically detects recognition of methyl salicylate by the recognition section.

(Supplementary Note 19)

The methyl salicylate sensor according to Supplementary note 18, wherein the optical detection section at least comprises an excitation light source and a detection element.

(Supplementary Note 20)

A methyl salicylate sensor for detecting methyl salicylate, at least comprising: (i) a recognition section for methyl salicylate that comprises a zinc compound; and (ii) a detection section that electrochemically detects recognition of methyl salicylate by the recognition section.

(Supplementary Note 21)

The methyl salicylate sensor according to Supplementary note 20, wherein the electrochemical detection section comprises an electrochemical cell having an electrode that detects a current caused by oxidation of a complex formed by the zinc compound and methyl salicylate.

(Supplementary Note 22)

A method for detecting pathogen infection in a crop, comprising installing the methyl salicylate sensor according to any one of Supplementary notes 8 and 18 to 21 in a vicinity of the crop, and detecting methyl salicylate by the methyl salicylate sensor.

(Supplementary Note 23)

The method for detecting pathogen infection in a crop according to Supplementary note 7 or 22, wherein the methyl salicylate sensor is installed within 2 m from the crop.

This application is based upon and claims the benefit of priority from Japanese patent application No. 2021-049789, filed on Mar. 24, 2021, the disclosures of which are incorporated herein in their entirety by reference.

While the invention has been described with reference to example embodiments and examples thereof, the invention is not limited to these embodiments and examples. It will be understood by those of ordinary skill in the art that various changes in form and details may be made therein without departing from the spirit and scope of the present invention.

INDUSTRIAL APPLICABILITY

The sensing according to embodiments of the present invention in which a zinc compound is used as a receptor for detecting methyl salicylate, which is a plant hormone, selectively forms a complex with methyl salicylate and also exhibits a fluorescence emission phenomenon and a change in electrochemical behavior, and thus enables selective detection of methyl salicylate, which is a plant hormone released when a plant is infected by a pathogen.

By using a sensor in which the zinc compound serves as the recognition section, disease infection in a plant can be detected at an early stage, and specifically, as a sensor that can detect disease infection of a crop at an early stage, it can be used as a novel sensor for agricultural ICT in greenhouses and other horticultural facilities.

EXPLANATION OF REFERENCE

1 methyl salicylate sensor
2 recognition section
3 detection section

What is claimed is:

1. A sensing method for sensing methyl salicylate, using a zinc compound as a receptor that selectively recognizes methyl salicylate.

2. The sensing method according to claim 1, wherein the zinc compound is at least one compound selected from the group consisting of zinc (II) acetate, zinc (II) formate dihydrate, zinc (II) butyrate, zinc (II) oxalate dihydrate, zinc (II) hexanoate, zinc (II) propionate, zinc (II) tartrate dihydrate, zinc (II) benzoate, zinc (II) octanoate, zinc (II) oleate, zinc (II) nitrate and zinc (II) chloride.

3. The sensing method according to claim 1, wherein the sensing utilizes a phenomenon in which methyl salicylate reacts with the zinc compound to form a complex and exhibit fluorescence emission.

4. The sensing method according to claim 1, wherein the sensing utilizes a phenomenon in which electrochemical behavior is changed by a reaction of the zinc compound and methyl salicylate.

5. The sensing method according to claim 4, wherein the sensing utilizes a change in current value caused by a reaction of the zinc compound and methyl salicylate.

6. A methyl salicylate sensor for detecting methyl salicylate, at least comprising:

i) a recognition section for methyl salicylate that comprises a zinc compound; and ii) a detection section that detects recognition of methyl salicylate by the recognition section.

7. A method for detecting pathogen infection in a crop, comprising installing a methyl salicylate sensor in a vicinity of the crop, and detecting methyl salicylate by the methyl salicylate sensor, wherein the methyl salicylate sensor at least comprises:

i) a recognition section for methyl salicylate that comprises a zinc compound; and ii) a detection section that detects recognition of methyl salicylate by the recognition section.

8. The methyl salicylate sensor for detecting methyl salicylate according to claim 6, the detection section comprising an optical and/or electrochemical detection element and a computer, wherein the methyl salicylate sensor has a program that causes the computer to execute:

i) receiving a signal from the optical and/or electrochemical detection element;

ii) analyzing the received signal to determine presence or absence of methyl salicylate and/or a concentration thereof; and iii) outputting an analysis result.

9. The methyl salicylate sensor for detecting methyl salicylate according to claim 6, wherein the detection section comprises an optical detection section that optically detects recognition of methyl salicylate by the recognition section.

10. The methyl salicylate sensor according to claim 9, wherein the optical detection section at least comprises an excitation light source and a detection element.

11. The methyl salicylate sensor for detecting methyl salicylate according to claim 6, wherein the detection section comprises an electrochemical detection section that electrochemically detects recognition of methyl salicylate by the recognition section.

12. The methyl salicylate sensor according to claim 11, wherein the electrochemical detection section comprises an electrochemical cell having an electrode that detects a current caused by oxidation of a complex formed by the zinc compound and methyl salicylate.

13. The method for detecting pathogen infection in a crop according to claim 7, the detection section comprising an optical and/or electrochemical detection element and a computer, wherein the methyl salicylate sensor has a program that causes the computer to execute:

i) receiving a signal from the optical and/or electrochemical detection element;

ii) analyzing the received signal to determine presence or absence of methyl salicylate and/or a concentration thereof; and iii) outputting an analysis result.

14. The method for detecting pathogen infection in a crop according to claim 7, wherein the methyl salicylate sensor is installed within 2 m from the crop.

15. The sensing method according to claim 1, comprising: (i) allowing a zinc compound to react with methyl salicylate to form a complex; (ii) exposing the complex to excitation light; and (iii) detecting fluorescence emitted by the complex.

16. The sensing method according to claim 15, wherein the excitation light has a wavelength in a range of 200 to 400 nm.

17. The sensing method according to claim 1, comprising: (i) allowing a zinc compound to react with methyl salicylate in a solution to form a complex; (ii) measuring a current flowing through the solution under a certain voltage; and (iii) detecting a change in current value caused by formation of the complex.

18. The sensing method according to claim 17, wherein a value of the voltage is in a range of −1 to 2 V.

19. The sensing method according to claim 17, wherein the solution comprises tetrabutylammonium perchlorate as a supporting electrolyte.

* * * * *